UNITED STATES PATENT OFFICE 2,692,284

METHOD FOR PREPARING KETIMINES

Vernon E. Haury, Simi, Calif., assignor to Shell Development Company, Emeryville, Calif., a corporation of Delaware No Drawing. Application November 28, 1952, Serial No. 323,162

11 Claims. (Cl. 260—566)

This invention relates to a method for preparing ketimines, i. e., compounds of the formula

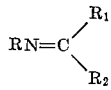

wherein R, R₁ and R₂ are organic radicals other than hydrogen. More particularly, the invention relates to a novel method for preparing ketimines by reacting another ketimine with a ketone.

Specifically, the invention provides a new and highly efficient method for preparing new ketimines from dissimilar ketimines and ketones which comprises heating the dissimilar ketimine with a mono-ketone which has a higher boiling point than that of the ketone to be formed in the reaction, preferably in the presence of an acid or acid-acting catalyst, whereby the two components reaction so as to effect an exchange of the radical which is attached to the nitrogen atom through the double bond in the ketimine molecule for the radical which is attached through a double bond to the keto oxygen atom in the mono-ketone and thereby form a new ketimine and new mono-ketone and removing the formed monoketone product from the reaction mixture substantially as fast as it is formed therein.

This application is a continuation-in-part of my application Serial No. 17,797, filed March 29, 1948, now abandoned.

Ketimines have heretofore been prepared by condensing a compound containing an amino group with a ketone, the reaction going forward in the presence of a condensation catalyst which is usually of the acid type. Many ketimines, however, cannot be prepared by this method, or at least the yield thereof is poor. In other cases, while some of the desired ketimine is obtained by condensing the amino and ketone reactant, the amount of various by-products formed are so large that the process must be considered impractical of operation.

It is, therefore, an object of the invention to provide an improved method for preparing ketimines. It is a further object to provide a method for preparing ketimines by reacting a dissimilar ketimine with a mono-ketone. It is a further object to provide a method whereby a ketimine and a mono-ketone are reacted together to form a new ketimine and a new mono-ketone. It is a further object to provide a method for preparing ketimines that is easily operated and gives high yield of the desired ketimine. Other objects and advantages of the invention will be apparent from the following detailed description thereof.

It has now been discovered that new ketimines can be obtained by heating a dissimilar ketimine with a mono-ketone which has a boiling point higher than that of the ketone to be formed in the reaction, preferably in the presence of an acid or acid-acting catalyst, whereby the two components react so as to effect an exchange of the radical which is attached to the nitrogen atom through the double bond in the ketimine molecule for the radical which is attached through the double bond to the keto oxygen atom in the mono-ketone, and thereby form a new ketimine and new ketone, and removing the formed ketone from the reaction mixture substantially as fast as it is formed therein.

This process may be exemplified by the following equation showing the production of N-(2-butylidene) hexylamine by reacting N-(2-propylidene) hexylamine with methyl ethyl ketone:

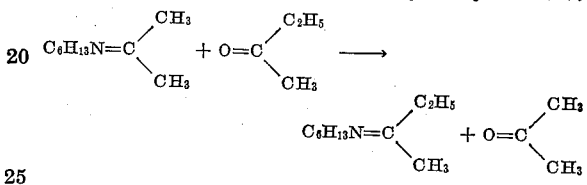

The above-described process of the invention is unobvious and could not have been foreseen. This stems in large part from the fact that the mono-ketone and ketimines are notably active compounds which, on being combined would be expected to condense and give rise to a wide variety of reaction products other than the desired ketimine. High yields of from 70% to 100%, of the ketimine, however, are not uncommon in the present process. Particularly surprising is the fact that unsaturated ketones, such as methyl isopropenyl ketone, may be combined with the proper ketimines to produce ketimines having a conjugated system of double bonds involving three carbon atoms and the terminal nitrogen atom, a system which is rarely encountered and is difficult of operation at best.

The ketimines used in the process of the invention are those of the formula

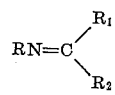

wherein R, and R₁ and R₂ are organic radicals other than hydrogen, and are preferably hydrocarbon radicals such as aliphatic or aromatic hydrocarbon radicals. For clarity in understanding the invention, the ketimines will be described herein and in the appended claims as substituted amines. Thus, when R, R₁ and R₂ in the above-described formula are hydrocarbon radicals, the ketimines may be generically described as N-(hydrocarbylidene) hydrocarbylamines wherein the hydrocarbylidene group is attached to the nitrogen atom through a secondary carbon atom. The expression "hydrocarbylidene" as used herein and in the appended claims refers to a hydrocarbon radical, the free bond of which consists of two adjacent valences of a single carbon atom. The expression "hydrocarbyl" as used herein and in the appended claims refers to a hydrocarbon radical, the free bond of which consists of a single valence of a single carbon atom.

Examples of ketimines that may be used in the present process include N-(2-butylidene) amylamine, N-(2-isooctylidene) phenylamine, N-(2-pentylidene) nonylamine, N - (3 - cyclohexyl-2-butylene) 1,3-dimethylbutyl amine, N-(4-hexen-2-ylidene) 1,3-diethylbutylamine, N-(2-phenyl-4-hexylidene) cyclohexylamine, N-(4-hexyn-2-ylidene) 1,3-diethylhexylamine, N - (3 - amylidene) naphthylamine, N-(2-octylidene) 1-cyclohex-3-enylamine and N-(2-decylidene) 2,4-hexadienylamine.

Preferred ketimines to be used in the present process are the N-(alkylidene) alkylamines, the N-(alkylidene) alkenylamines, the N-(alkylidene) cycloalkylamines, the N-(alkylidene) arylamines and the N-(alkylidene) alkarylamines, the N-(arylalkylidene) alkylamines, the N-(arylalkylidene) alkenylamines, the N-(arylalkylidene) cycloalkylamines, the N-(arylalkylidene) arylamines and the N-(arylalkylidene) alkarylamines, the alkylidene, cycloalkylidene and arylalkylidene groups in the aforedescribed compounds being joined to the nitrogen atom through two valences of a single secondary carbon atom. Examples of these preferred ketimines include N-(2-butylidene) octylamine, N-(3-octylidene) amylamine, N-(3-hexylidene) allylamine, N-(2-butylidene) hex-2-enylamine, N-(2-pentylidene) phenylamine, N-(3-hexylidene) cyclohexylamine, N-(2-pentylidene) 2-methylphenylamine, N-(3-phenyl-2-butylidene) butylamine, N-(3-phenyl-3 - hexylidene) 1,3 - diethylbutylamine, N - (3-phenyl-3-hexylidene) allylamine, N-(2-phenyl-3-hexylidene) cyclohexylamine, N-(3-phenyl-3-octylidene) phenylamine, N-(2-toluyl-3-hexylidene) 4-isopropylphenylamine.

Of special interest, particularly because of the ease of operation of the process, are those ketimines possessing an alkylidene group attached to the nitrogen atom, such as the N-(alkylidene) alkylamines, the N-(alkylidene) alkenylamines, the N-(alkylidene) cycloalkylamines and the N-(alkylidene) arylamines, and particularly those aliphatic ketimines of the formula

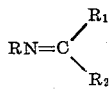

wherein R, R₁ and R₂ are alkyl radicals, preferably containing from 1 to 12 carbon atoms, and more particularly from 1 to 4 carbon atoms.

The ketimines described above may be prepared by a variety of methods known to the art. Many of them may, for example, be prepared by the conventional method of reacting a ketone with an amine, such as described in U. S. 2,533,723. Many of the starting ketimines may also be prepared by the presently described process.

The mono-ketones used in the process of the invention may be any keto-substituted compound which has a boiling point higher than the boiling point of the mono-ketone to be formed in the reaction mixture. The mono-ketone reactant may be aliphatic, cycloaliphatic, heterocyclic or aromatic-substituted and may be saturated or unsaturated and possess straight or branched chains. Examples of such mono-ketones include methyl ethyl ketone, dibutyl ketone, ethyl butyl ketone, methyl isopropyl ketone, methyl octyl ketone, phenyl methyl ketone, methyl amyl ketone, cyclohexanone, cyclohexyl methyl ketone, acetophenone, 3-hexenyl methyl ketone, methyl benzyl ketone, pyrryl methyl ketone, dicyclopentyl ketone and pyrryl butyl ketone.

Preferred mono-ketones to be used in the process comprise the hydrocarbyl ketones, i. e., the mono-keto substituted hydrocarbons, such as ethyl butyl ketone, methyl octyl ketone, phenyl methyl ketone, cyclohexyl methyl ketone, and dioctyl ketone. Of this group, those that are particularly preferred are the alkanones, the alkenones, the cycloalkanones, the cycloalkenones and the aryl and alkaryl substituted alkanones all of which preferably contain less than 12 carbon atoms.

Of special interest, particularly because of the ease of operation of the process, are the keto-substituted aliphatic open-chain hydrocarbons such as the alkanones and alkenones containing from 3 to 12 carbon atoms, and more particularly those of the formula

wherein R₃ and R₄ are aliphatic open-chain hydrocarbon radicals, preferably containing from 2 to 6 carbon atoms.

In the operation of the present process, any of the above-described ketimines may be reacted with any of the above-described mono-ketones. Thus, N-(2-butylidene) 1,3-dimethylbutylamine may be reacted with methyl isobutyl ketone to produce N-(1,3-dimethylbutylidene) 1,3-dimethylbutylamine, N-(2-butylidene) cyclohexylamine may be reacted with methyl benzyl ketone to produce N-(2-phenylpropylidene) cyclohexylamine, N-(2-butylidene) 1,3-dimethylbutylamine may be reacted with diamyl ketone to produce N-(6-dodecylidene) 1,3-dimethylbutylamine, N-(2-propylidene) octylamine may be reacted with ethyl butyl ketone to produce N-(3-heptylidene) octylamine, and N-(2-propylidene) propylamine may be reacted with methyl isopropenyl ketone to produce N-(3-methyl-3-propen-2-ylidene) propylamine.

The reaction between the above-described ketimines and monoketones is accomplished by heating the two components together and removing the mono-ketone formed in the reaction mixture from the said mixture substantially as fast as it appears therein. The ketimines and mono-ketones may be combined with either one or both in stoichiometric excess, such as from 1 to 3 mols of one compound for every mol of the other. Generally speaking, however, the most advantageous results in respect to the yield of ketimine product are obtained through use of the reactants in the mol for mol proportions which are theoretically required.

Heat should generally be applied to effect the reaction between the ketimine and mono-ketone. In general temperatures as low as 30° C. or 40° C. are sufficient to cause the reaction to take place. However, as the mono-ketone formed in the reaction must be removed substantially as fast as it appears in the reaction mixture and such removal is preferably accomplished by the use of distillation, the temperature of the reaction mixture is preferably maintained at a temperature at least equal to the boiling temperature of the mono-ketone product so as to carry the said ketone over into the distillate. In general, temperatures used in the process vary from 30° C. to 250° C., and more preferably from 50° C. to 150° C.

The reaction is preferably conducted at atmospheric pressure, but in some instances it may be desirable to use superatmospheric or subatmospheric pressures. One instance where it may be desirable to use subatmospheric pressure is where the mono-ketone product to be removed from the reaction mixture has a boiling point which is higher than the temperature at which it is desired to conduct the reaction. In such a case, the establishment of a subatmospheric pressure in the reaction chamber permits removal of the ketone at a lower temperature than would otherwise be possible.

The reaction may be accomplished in the absence of catalytic material, but in many cases the reaction is slow and it is desirable to speed the reaction by the addition of certain catalysts, such as acidic catalysts. Acid-acting salts, such as zinc chloride, sodium acid phosphate, sodium bisulfate and aluminum sulfate and acids, such as hydrochloric acid, sulfuric acid, hydrobromic acid, sulfurous acid, selenic acid, orthophosphoric acid, benzensulfonic acid and oxalic acid have proved to be valuable materials for this purpose. In general, the amount of catalyst will range from 0.01% to 5% and preferably from 0.5% to 1%, based on the weight of the ketimine reactant.

The process of the invention may be carried out in the presence or absence of solvents or diluents. In general, however, solvents or diluents are not employed as both the mono-ketone and ketimine reactants as well as the ketimine product are normally liquid at the temperature employed. If a solvent or diluent is used, as to place the mixture in a more fluid condition, it should be a material which is both liquid and inert under the prevailing reaction conditions. Materials that may be used for this purpose are, for example, isooctane, xylene, dioxane and diethylene glycol diethyl ether.

The time required for the reaction will vary over a considerable range depending on the type of reactants used in the process, use of the catalysts and the temperature employed. When catalysts are employed, the reaction may generally be completed in from 1 to 3 or 5 hours. The reaction is preferably continued until no more of the mono-ketone formed in the reaction is recovered in the distillate.

After the reaction is complete, the ketimine product is separated from the other components of the reaction mixture by any convenient method. A preferred separation method is that of fractional distillation, at reduced pressure if necessary, as the ketimines are normally stable materials that can be volatilized without decomposition. However, other methods of separation may be used.

The process of the invention may be carried out in a batchwise, continuous or semi-continuous manner. For batch treatment, the ketimine and mono-ketone reactants are preferably introduced in a reaction vessel equipped with distillation means and the temperature maintained sufficiently high to remove the mono-ketone product formed in the reaction in the distillate substantially as fast as it appears in the reaction mixture. If a continuous operation is desired, it is preferably accomplished by adding the mono-ketone and ketimine continuously or intermittently to the reaction vessel as the reaction progresses and continuously removing the mono-ketone product by distillation.

To illustrate the manner in which the invention may be carried out, the following examples are given. It is to be understood, however, that the examples are for the purpose of illustration and the invention is not to be regarded as limited to any of the specific materials or conditions recited therein.

*Example I*

Approximately 0.2 mol of N-(2-butylidene) 1,3-dimethylbutylamine was combined with 0.2 mol of methyl isobutyl ketone and 0.1 gram of ZnCl₂ catalyst in a glass reaction flask equipped with distillation means. The mixture was brought to reflux and the methyl ethyl ketone removed in the distillate substantially as fast as it was formed in the reaction. After refluxing for one hour, 12 grams of methyl ethyl ketone and 33 grams of N-(1,3 - dimethylbutylidene) 1,3 - dimethylbutyl amine had been recovered. The latter material had a boiling point of 109° C. to 111° C. at 50 mm. Hg, a specific gravity (20/4) of 0.78 and a refractive index (20/D) of 1.431.

In a similar manner N-5-nonylidene) 1,3-dimethylbutylamine is produced by reacting N-(2-butylidene) 1,3-dimethylbutylamine with dibutyl ketone, and N-(6-dodecylidene) 1,3-dimethylbutylamine is produced by reacting N-(2-butylidene) 1,3-dimethylbutylamine with diamyl ketone.

*Example II*

Approximately two mols of N-(2-propylidene) octylamine is combined with approximately two mols of ethyl butyl ketone and 0.5 gram of ZnCl₂ in a glass reaction flask equipped with distillation means. The mixture is maintained at reflux and acetone is recovered in the distillate. When no more acetone is recovered, the mixture is distilled to produce N-(3-heptylidene) octylamine. The product was identified by acid hydrolysis.

N-(5-nonylidene) octylamine is produced in a similar manner by replacing the ethyl butyl ketone in the above-described process with dibutyl ketone.

*Example III*

One mol of N-(2-butylidene) cyclohexylamine is combined with one mol of dibutyl ketone and 1 gram of sulfuric acid added thereto. This mixture is maintained at reflux and methyl ethyl ketone is removed by distillation as fast as it is formed in the reaction mixture. When no more methyl ethyl ketone is recovered, the mixture is distilled to produce N-(5-nonylidene) cyclohexylamine.

In a similar manner N-(5-decylidene) 2-cyclopentenylamine is produced by reacting N-(2-butylidene) 2-cyclopentenylamine with butyl pentyl ketone, and N-(5-decylidene) 3-methylcyclopentylamine is produced by reacting N-(2-propylidene) 3-methylcyclopentylamine with butyl pentyl ketone.

*Example IV*

About one mol of N-(2-propylidene) propylamine is combined with approximately one mol of methyl isopropenyl ketone and 0.5 gram of ZnCl₂ in a glass reaction flask equipped with distillation column. The mixture is maintained at reflux and acetone is recovered in the distillate. When no more acetone is recovered, the mixture is distilled to produce N-(3-methyl-3-propen-2-ylidene) propylamine.

N-(3-hexen-2-ylidene) phenylamine is produced in a similar manner by reacting N-(2-propylidene) phenylamine with methyl-2-butenyl ketone.

*Example V*

One mol of N-(2-propylidene) allylamine is combined with about 2 mols of methyl butyl ketone in the glass reaction flask described in Example I. The mixture is maintained at reflux and acetone is recovered in the distillate. When no more acetone is recovered, the mixture is distilled to produce N-(2-hexylidene) allylamine.

I claim as my invention:

1. A process which comprises heating a ketimine of the formula

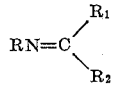

wherein $R_1$ and $R_2$ are alkyl radicals containing from 1 to 12 carbon atoms and R is a member of the group consisting of alkyl, alkenyl, cycloalkyl and aryl radicals containing no more than 12 carbon atoms, with a ketone

wherein $R_3$ and $R_4$ are aliphatic open-chain hydrocarbon radicals containing no more than 6 carbon atoms, which ketone has a higher boiling point than the ketone to be formed in the reaction, whereby there is an exchange of the hydrocarbylidene group in the said ketimine reactant for the hydrocarbon group attached through a double bond to the keto oxygen atom in the said ketone reactant to form a ketimine and a ketone which differ from the ketimine and ketone used as reactants, said heating being accomplished at a temperature at least equal to the boiling temperature of the ketone formed in the mixture from that mixture so as to effect a simultaneous distillation of the formed ketone from the reaction mixture as the reaction progresses.

2. A process which comprises heating a ketimine of the formula

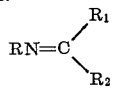

wherein R, $R_1$ and $R_2$ are alkyl radicals containing from 1 to 12 carbon atoms, with a ketone

wherein $R_3$ and $R_4$ are aliphatic open-chain hydrocarbon radicals containing no more than 6 carbon atoms, which ketone has a higher boiling point than the ketone produced in the reaction, whereby there is an exchange of the alkylidene group in the said ketimine molecule for the hydrocarbon group attached through a double bond to the oxygen atom in the ketone reactant so as to form a ketimine and a new ketone which ketimine and ketone are dissimilar to the ketimine and ketone used as reactants, said heating being accomplished at a temperature at least equal to the boiling point of the ketone formed in the reaction so that there is a simultaneous distillation of the formed ketone from the reaction mixture as the reaction progresses.

3. The method as defined in claim 2 wherein the ketimine reactant is N-(2-butylidene) 1,3-dimethylbutylamine.

4. The method as defined in claim 2 wherein the ketone reactant is methyl isopropenyl ketone.

5. The method as defined in claim 2 wherein the ketone reactant is methyl ethyl ketone.

6. A process which comprises heating a ketimine of the formula

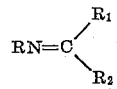

wherein R, $R_1$ and $R_2$ are alkyl radicals containing from 1 to 12 carbon atoms, with a ketone

wherein $R_3$ and $R_4$ are aliphatic open-chain hydrocarbon radicals containing no more than 6 carbon atoms, which ketone has a higher boiling point than the ketone to be produced in the reaction, in a molar ratio varying between 3:1 and 1:3, in the presence of an acidic catalyst whereby there is an exchange of the alkylidene group in the said ketimine molecule for the hydrocarbon group attached through a double bond to the oxygen atom in the said ketone so as to form a ketimine and a ketone which differ from the ketimine and ketone used as reactants, said heating being accomplished at a temperature at least equal to the boiling point of the ketone formed in the reaction so that there is a simultaneous distillation of the formed ketone from the reaction mixture as the reaction progresses.

7. The method as defined in claim 6 wherein the ketone reactant is methyl isobutyl ketone.

8. The method as defined in claim 6 wherein the ketone reactant is ethyl butyl ketone.

9. A process which comprises heating a ketimine of the formula

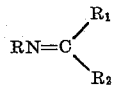

wherein R, $R_1$ and $R_2$ are alkyl radicals containing from 1 to 12 carbon atoms, with a ketone

wherein $R_3$ and $R_4$ are aliphatic open-chain hydrocarbon radicals containing no more than 6 carbon atoms and one of the said aliphatic open-chain hydrocarbon radicals has an ethylenic group in the alpha, beta position relative to the keto group, which ketone has a higher boiling point than the ketone to be produced in the reaction, in a molar ratio varying from 3:1 to 1:3, in the presence of an acidic catalyst whereby there is an exchange of the alkylidene group in the said ketimine molecule for the hydrocarbon group attached through a double bond to the oxygen atom in the said ketone so as to form a ketimine and a ketone which differ from the ketimine and ketone used as reactants, said heating being accomplished at a temperature at least equal to the boiling point of the ketone formed in the reaction so that there is a simultaneous distillation of the formed ketone from the reaction mixture as the reaction progresses.

10. The method as defined in claim 9 wherein the ketone reactant is methyl isopropenyl ketone.

11. The method as in claim 9 wherein the ketimine reactant is N-(2-propylidene) propylamine.

References Cited in the file of this patent

UNITED STATES PATENTS

| Number | Name | Date |
|---|---|---|
| 2,418,173 | Haury | Apr. 1, 1947 |